United States Patent Office 3,784,508
Patented Jan. 8, 1974

3,784,508
RAPID CURE POLYEPOXIDE OXAZINE OR
OXAZOLINE SYSTEMS
Donald A. Tomalia and Robert J. Thomas, Midland, Mich., assignors to The Dow Chemical Company, Midland, Mich.
No Drawing. Continuation-in-part of abandoned application Ser. No. 131,406, Apr. 5, 1971. This application Sept. 15, 1972, Ser. No. 289,324
Int. Cl. C08g 30/14
U.S. Cl. 260—47 EN    4 Claims

ABSTRACT OF THE DISCLOSURE

This invention relates to compositions of matter consisting essentially of (1) a latent curable prepolymer of a polyepoxide and an oxazine or oxazoline compound and (2) a polymerization accelerator which is soluble in said polymer at a temperature less than about 90° C. in an amount of from about 1 to 5 percent by weight of prepolymer and which is a compound selected from the group consisting of compounds of the formula $$R(X)_n$$

wherein R is an aliphatic radical, X is halogen, COOH or SH and $n$ is an integer of at least 2; and $$R(X)_n$$

wherein R is an aromatic radical, and X is OH or SH and $n$ is an integer of from 1 to 3.

---

This application is a continuation-in-part of copending application Ser. No. 131,406 filed Apr. 5, 1971 and now abandoned.

BACKGROUND

The preparation of cured systems, composed of a polyepoxide and an oxazine and oxazoline compound are known, e.g., as described in Belgium Pat. 752,047 issued Dec. 16, 1970. Such systems are prepared by first heating a substantially uncured mixture of polyepoxide and oxazine or oxazoline for a period of about 15 to 30 minutes at a temperature of about 120° C. to prepare a latent curable linear prepolymer; followed by curing such prepolymer at a temperature of from about 120° C. to 150° C. for a period of from about 1 to 8 hours to form a tough, cross-linked resin.

The described curing process and conditions are generally acceptable for applications such as encapsulation and coatings.

It is often desirable, however, to obtain polyepoxide, oxazine or oxazoline systems which possess long pot lives but yet will gel rapidly upon heating. This latter property is particularly valuable in order to effectively reduce residence time in molding equipment or on the mandrels in the case of filament winding applications.

It is the primary object of this invention to provide such a system.

SUMMARY

The above, and related objects are obtained by preparing compositions consisting essentially of (1) a latent curable prepolymer of a polyepoxide and an oxazine or oxazoline compound and (2) a polymerization accelerator therefore which is soluble in said prepolymer in an amount of from about 1 to 5 percent by weight of prepolymer and which is a compound of the formula $$R(X)_n$$

wherein R is an aliphatic radical, X is halogen, COOH or SH and $n$ is an integer of at least 2; and $$R(X)_n$$

wherein R is an aromatic radical, and X is OH or SH and $n$ is an integer of from 1 to 3.

DESCRIPTION OF THE PREFERRED EMBODIMENTS

The latent curable prepolymer utilized in the present invention is prepared by reaction of a polyepoxide and an oxazine or oxazoline compound, as set forth in Belgium Pat. 752,047 issued Dec. 16, 1970.

More particularly, the polyepoxide employed in the preparation of latent curable prepolymer may be any of the known curable polyepoxides. Especially useful are those compounds having an average of more than one 1,2-epoxyaliphatic group per molecule and particularly the polyglycidyl ethers of polyhydric phenols such as the diglycidyl ethers of 2,2'-bis(parahydroxyphenylpropane), known as bisphenol A, and methylene bisphenol, known as bisphenol F; their partially halogenated counterparts such as the diglycidyl ether of tetrabrominated bisphenol A; epoxylated derivatives of the novolacs such as their reaction products under basic conditions with epichlorohydrin; and terminally epoxylated polyalkylene glycols such as the doubly epoxylated polyethylene and polypropylene glycols.

Particularly suitable for use as an oxazine or oxazoline in the preparation of such latent curable prepolymers is a monooxazine or monooxazoline compound that is unsubstituted 2-oxazoline or unsubstituted 5,6-dihydro-4H-1,3-oxazine, or either of the foregoing with, as substituent upon the 5- or 6-position, alkyl of from 1 to 10 carbon atoms; or any of the same with, as substituent on the 2-position, alkyl of from 1 to 10 carbon atoms; cycloalkyl of from 3 to 6 carbon atoms; alkenyl, alkadienyl, or alkatrienyl of from 1 to 10 carbon atoms; alkoxy of from 1 to 10 carbon atoms; alkylol of from 1 to 10 carbon atoms; nitro; furyl; fluoro; chloro; bromo; iodo; trifluoromethyl; chloroalkyl or bromoalkyl of $n$ carbon atoms and from 1 to $2n+1$ halogens, $n$ being from 1 to 10; alkoxyalkyl or alkylthioalkyl in either of which any alkyl is of from 1 to 10 carbon atoms; alkylthio of from 1 to 10 carbon atoms; phenyl; or substituted phenyl in which a substituent upon such substituted phenyl is from those above designated there being from 1 to five of such substituents upon said phenyl.

Among the specific oxazine compounds that may be used, each being a 5,6-dihydro-4H-1,3-oxazine, are 2-vinyloxazine, 6-methyl-6-phenyl-2-vinyloxazine, 6-methyl-2-(2-piperidinoethyl)-6-vinyloxazine, 6-methyl - 2,6 - divinyloxazine, and 2-methyloxazine.

Among the oxazoline compounds that may be employed are 2-methyloxazoline,
2,4-dimethyloxazoline,
2-ethyloxazoline,
2,5-dimethyloxazoline,
4,5-dimethyl-2-vinyloxazoline,
2-propyloxazoline,
2-cyclopropyloxazoline,
2-vinyloxazoline,
4-methyl-2-vinyloxazoline,
5-methyl-2-vinyloxazoline,
2-isopropenyl-2-oxazoline,
2-isopropenyl-4,5-dimethyloxazoline,
5-decyl-2-vinyloxazoline,
2-ethoxyoxazoline,
2,4-dimethyl-4-methanoloxazoline,
2-ethoxy-2-oxazoline,
2-(2-methoxy-1-methylethyl)oxazoline,
2-(2-(hexyloxy)ethyl)oxazoline,
2-(ethylthio)oxazoline,
2-(2-butylthio)-1-methylethyl)oxazoline, 2-(1-methyl-2-(octylthio)ethyl)oxazoline,
2-(1-methyl-2-(dodecylthio)ethyl)oxazoline,
2-(dichloromethyl)oxazoline,
2-(trichloromethyl)oxazoline,
2-(1,1-dichloroethyl)- and
2-(1,1-dichloropropyl)oxazoline,
2-(1,1,3-trichloropropyl)oxazoline,
2-(2-furyl)oxazoline,
2-phenyl-oxazoline,
2-(m-tolyl)oxazoline,
2-(p-tolyl)oxazoline,
5-methyl-2-phenyloxazoline,
2-(p-methoxyphenyl)oxazoline,
2-(p-chloro-phenyl)oxazoline, and its o and m isomers, 2-p-fluorophenyloxazoline,
2-(m-bromophenyl)oxazoline,
2-(p-bromophenyl)oxazoline,
the m, p, and o-2-α,α,α-trifluorotolyl)oxazolines,
2-(p-nitrophenyl)oxazoline, and its m and o isomers, 2-styryloxazoline,
5,5-dimethyl-2-(3,4-xylyl)oxazoline,
2-(3,4-dimethoxyphenyl)oxazoline,
5,5-dimethyl-2-(3,4,5-trimethoxyphenyl)oxazoline,
4,4-dimethyl-2-(3,4,5-trimethoxyphenyl)oxazoline,
2-(p-methoxyphenyl)-5-phenyloxazoline, and
2-((3,4-dichlorophenoxy)methyl)oxazoline.

In general, a monooxazine or monooxazoline, when used as the curing agent, is employed in an amount of from 1 to 49 equivalent weight per equivalent of epoxy functionality. However, as the amount of monooxazine and of monooxazoline combined with curable polyepoxide is reduced below that amount which is equivalently stoichiometric, the strength of the resulting resins rises and continues to increase to a maximum from about 10 to about 40 equivalent percent by weight of curable mixtures. Below about 5 equivalent percent, good resins continue to be formed but curing time becomes longer.

Various methods for preparing monooxazine and monoxazoline compounds are known. One convenient method involves reacting a nitrile with trimethylene chlorohydrin or ethylene chlorohydrin in presence of hydrogen chloride and then cyclizing the intermediate thus formed with a base such as triethylamine, trimethylamine, or an alkali metal hydroxide. The cyclizing reaction is generally exothermic and is preferably carried out at a temperature within the range of from 0 to 10° C.

Also suitable for use is a di-2-oxazine or di-2-oxazoline compound, such as for example a compound of the formula

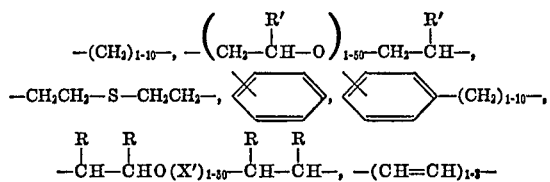

wherein X represents

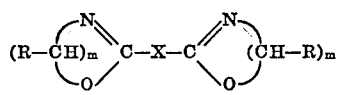

and in the above formulae each R represents hydrogen or alkyl having from 1 to 4 carbon atoms, each R' represents hydrogen or alkyl having from 1 to 3 carbon atoms, m represents 2 or 3, and X' represents ethyleneoxy or propyleneoxy.

In general, the di-2-oxazine or di-2-oxazoline is employed in an amount of from 1 to 100 equivalent percent based on epoxy functionality. An amount within the range of from 25 to 100 equivalent percent is preferred, and in some cases at least, the optimum amount is about 100 equivalent percent.

The di-2-oxazoline and di-2-oxazine compounds are prepared by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered. Such procedures are described in U.S. Pat. 3,563,920 issued Feb. 16, 1971.

Initial curing of the prepolymers utilized in the invention is normally effected by heating, characteristically at a temperature above 50° C. and preferably about 120° C. over a period of from about 20 to 30 minutes.

The linear prepolymers can be maintained as low viscosity liquids by merely warming them at 35–80° C. They can be kept under these conditions for several days to a week without serious viscosity increases, thus allowing use in "prepreg" applications. Thermal cures (150° C.) can produce gelation in about ½ to 1 hour and cross-linked resins can be effected by heating for 1–8 hours in the absence of any additives. For some applications, such as filament winding, these cure rates are considered to be too long.

It has been discovered, which discovery forms the present invention, that such cure rates can be greatly increased by dissolving in the prepolymers generally at a temperature less than 90° C., small but effective amounts, i.e., generally between about 1 and 5 percent by weight of prepolymer of a polymerization accelerator of the formula

wherein R is an aliphatic radical, X is halogen, COOH or SH and n is an integer of at least 2; and

wherein R is an aromatic radical, and X is OH and SH and n is an integer of from 1 to 3.

Exemplary of the preferred classes of accelerators are dibasic acids of the general formula

wherein n is 0 to 8 inclusive; dihalo compounds of the general formula

wherein X is bromine, chlorine or iodine and wherein n is 1 to 5 inclusive; thiol compounds of the general formula

wherein R is alkylene or phenylene; and hydroxy compounds of the general formula

wherein R in benzene and n is an integer of from 1 to 3.

Exemplary of useful compounds are phenol, catechol, resorcinol, hydroquinone, phloroglucinol, adipic acid, succinic acid, glutaric acid, pimelic acid, citric acid, methylene bromide, 1,2-dibromoethane, 1,3-dibromopropane, 1,4 - dibromobutane, 1,5 - dibromopentane, 1,5-dichloropentane, 1,2-dibromo-3-chloropropane, 1,2,3-tribromopropane, tribromonepentyl alcohol, tetrachloroethane, ethylene - bis - 3-mercaptopropionate, trimethylpropane-tris-3-mercaptopropionate, pentaerythritoltetra - 3 - mercaptopropionate, 4,4'-oxy-bis-thiophenol.

The admixture is then heated to a temperature of from about 120° C. to 150° C. until tough, cross-linked resins are obtained.

The following specific examples are illustrative of the invention:

Example 1

15.4 grams of a diglycidyl ether of 2,2'-bis(parahydroxyphenyl propane) having an epoxy equivalent weight of 186–192, and 9.6 grams of 2,2'-thiodiethylene-bis-2-oxazoline were mixed until homogeneous and then heated at 120° C. for 30 minutes. The mixture was then cooled to less than 90° C. and 1.0 gram of adipic acid was dissolved in the prepolymer with stirring. When the mixture was reheated to 150° C., the mixture gelled in about 15 minutes and become essentially completely cured in less than 1 hour to a material having a tensile strength of over 11,000 p.s.i.

By way of comparison, a prepolymer as described herein to which no dibasic acid was added, required a gel time of about 50 minutes and cured in 1 hour at 150° C. to a material having a tensile strength of only 7400 p.s.i.

Example 2

16.4 grams of the diglycidyl ether of 2,2'-bis(parahydroxyphenyl propane) of Example 1 and 8.6 grams of 2,2'-tetramethylene-bis-2-oxazoline were mixed until homogeneous and then heated at 120° C. for 30 minutes. The mixture was then cooled to less than 90° C. and 2.1 grams of 1,5-dibromopentane was dissolved in the prepolymer with stirring. When the mixture was heated to 150° C., the mixture gelled in about 10 minutes and cured in less than 1 hour to a solid having a tensile strength of about 13,000 p.s.i.

By way of comparison, a prepolymer as described herein to which no accelerator was added, required a gel time of about 100 minutes and further required heating at 150° C. for a period of 4 hours to achieve a tensile strength of up to 6600 p.s.i.

Example 3

15.4 grams of the diglycidyl ether of 2,2'-bis(parahydroxyphenyl propane) of Example 1 and 9.6 grams of the oxazoline of Example 1 were mixed until homogeneous and then heated at 120° C. for 30 minutes. The mixture was then cooled to less than 90° C. and 2.0 grams of ethylene-bis-3-mercaptopropionate was dissolved in the prepolymer with stirring. When reheated to 150° C., the mixture gelled in less than 10 minutes and cured in about 1 hour to a solid having a tensile strength of about 11,000 p.s.i.

Example 4

15.4 grams of the diglycidyl ether of 2,2'-bis(parahydroxyphenyl propane) of Example 1 and 9.6 grams of the oxazoline of Example 1 were mixed until homogeneous and then heated at 120° C. for 30 minutes. The mixture was then cooled to less than 90° C. and 1.0 gram or 2.0 grams of one of resorcinol was dissolved in the prepolymer with stirring. When the mixture was heated to 150° C. the mixture gelled in less than 10 minutes and cured in about 1 hour to a solid having a tensile strength of about 13,000 p.s.i.

Example 5

Similar good results pertaining to increased cure rates essentially as described in Examples 1 through 4 above were obtained utilizing a prepolymer based on a 10/1 mole ratio of the diglycidyl ether of 2,2'-bis(parahydroxyphenyl propane) in combination with 2-methyl-2-oxazoline, when such prepolymer was admixed with the referred to polymerization accelerators. By way of comparison, the use of water, ethylene glycol or butyric acid as the polymerization accelerator did not provide any evidence of polymerization acceleration.

Example 6

In each of a series of experiments, 15.4 grams of the diglycidyl ether of 2,2'-bis(parahydroxyphenyl propane) of Example 1 and 9.6 grams of the oxazoline of Example 1 were mixed until homogeneous and then heated at 120° C. for 30 minutes. The mixture was then cooled to less than 90° C. and 1.0, 1.5 or 2.0 grams of one of a series of additives were dissolved in the prepolymer with stirring. The following Table I sets forth the additives used and the gel time at 150° C. in minutes for the resulting compositions.

TABLE I

| Additive | Amount (gms.) | Gel time at 150° C. (min.) |
|---|---|---|
| $CH_2Br_2$ | 2.0 | 12 |
|  | 1.0 | 9 |
| 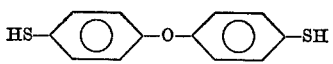 | 1.0 | 18 |
| $BrCH_2-\underset{Br}{CH}-CH_2-Br$ | 1.5 | 10 |
| $BrCH_2-\underset{Br}{CH}-CH_2Cl$ | 1.5 | 13 |
| $(BrCH_2)_3C-CH_2OH$ | 2.0 | 14 |
| $Cl_2CHCHCl_2$ | 2.0 | 12 |
| 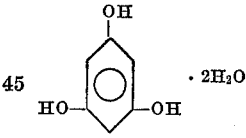 | 1.0 | 4 |
| None | | 55 |

What is claimed is:

1. In the method of preparing cured products from a mixture of epoxy resins and oxazine or oxazoline compounds, the improvement consisting of
   (1) first preparing a curable prepolymer composed of a polyepoxide having an average of more than one 1,2 - epoxyaliphatic group per molecule and an oxazine or oxazoline compound, said prepolymer being prepared by first heating a substantially uncured mixture of polyepoxide and oxazine or oxazoline for a period of about 15 to 30 minutes at a temperature of about 120° C., then
   (2) dissolving in said curable prepolymer from about 1 and 5 percent by weight of prepolymer of a compound selected from the group consisting of compounds of the formula $$R(X)_n$$

wherein R is an alkylene radical, X is halogen, COOH or SH and $n$ is an integer of from 2 to 4; and $$R(X)_n$$

wherein R is an aromatic radical, and X is OH or SH and $n$ is an integer of from 1 to 3 citric acid, ethylene-bis - 3 - mercaptopropionate, trimethylpropane-tris-3-mercaptopropionate, and pentaerythritol-tetra-3-mercaptopropionate then heating said prepolymer to curing temperatures.

2. The method of claim 1 wherein the oxazine or oxazoline compound employed is a monooxazine or monooxazoline compound that is unsubstituted 2-oxazoline or unsubstituted 5,6-dihydro-4H-1,3-oxazine, or either of the foregoing with, as substituent upon the 5- or 6-position, alkyl of from 1 to 10 carbon atoms; or any of the same with, as substituent on the 2-position, alkyl of from 1 to 10 carbon atoms; cycloalkyl of from 3 to 6 carbon atoms; alkenyl, alkadienyl, or alkatrienyl of from 1 to 10 carbon atoms; alkoxy of from 1 to 10 carbon atoms; alkylol of from 1 to 10 carbon atoms; nitro; furyl; fluoro; chloro; bromo; iodo; trifluoromethyl; chloroalkyl or bromoalkyl of $n$ carbon atoms and from 1 to $2n+1$ halogens, $n$ being from 1 to 10; alkoxyalkyl or alkylthioalkyl in either of which any alkyl is of from 1 to 10 carbon atoms; alkylthio of from 1 to 10 carbon atoms; phenyl; or substituted phenyl in which a substituent upon such substituted phenyl is from those above designated there being from 1 to five of such substituents upon said phenyl.

3. The method of claim 1 wherein the oxazine or oxazoline compound is a di-2-oxazine or di-2-oxazoline of the formula

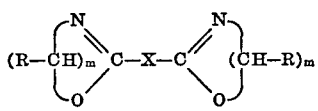

wherein X represents

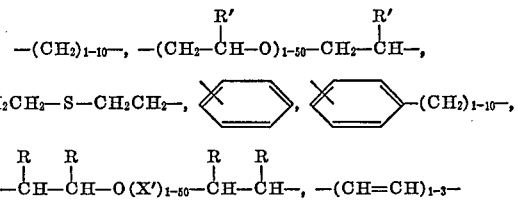

and in the above formulae each R represents hydrogen or alkyl having from 1 to 4 carbon atoms, each R' represents hydrogen or alkyl having from 1 to 3 carbon atoms, $m$ represents 2 or 3, and X' represents ethyleneoxy or propyleneoxy.

4. The method of claim 3 wherein said di-2-oxazine or di-2-oxazoline compound is present in an amount of from about 25 to 100 equivalent percent based on epoxy functionality.

References Cited
UNITED STATES PATENTS 3,563,920   2/1971   Tomalia et al. -------- 260—59
2,994,685   8/1961   Delmonte et al. ------ 260—47

OTHER REFERENCES

Handbook of Epoxy Resins by Lee & Neville, pp. 10–11 (1967).

WILLIAM H. SHORT, Primary Examiner

T. E. PERTILLA, Assistant Examiner

U.S. Cl. X.R.

260—2 N, 59